Oct. 1, 1940.                F. L. MAIN                2,216,124
                      HYDRAULIC BRAKE APPARATUS
                        Filed April 11, 1938              2 Sheets-Sheet 1
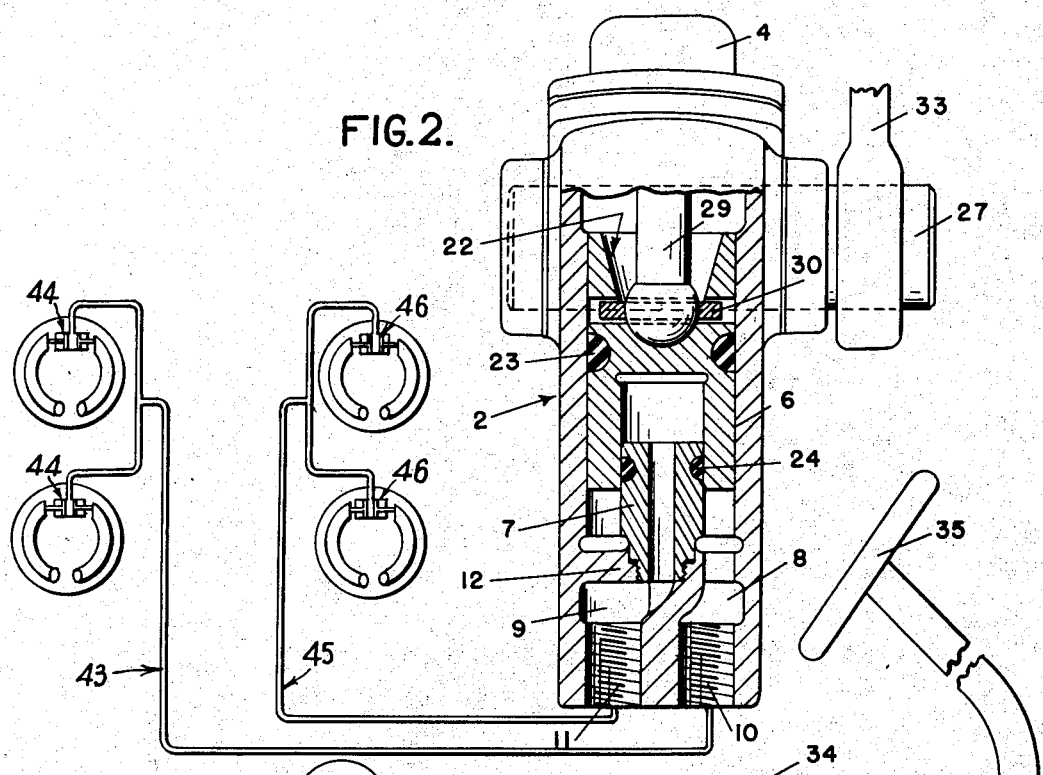
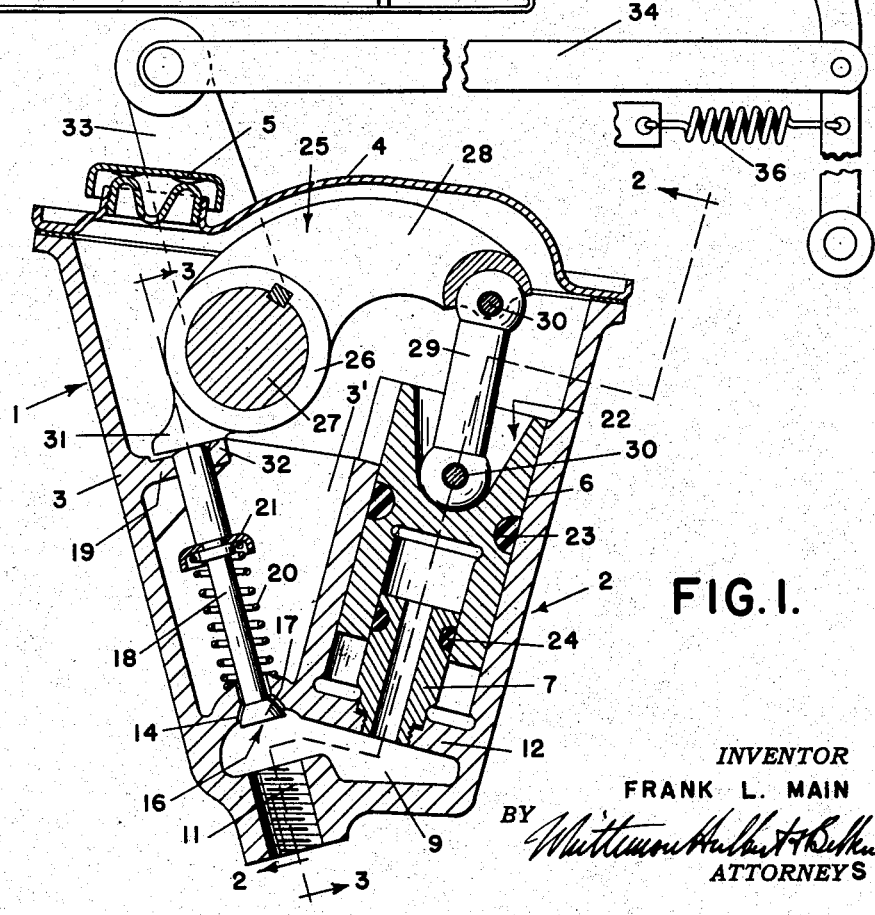
INVENTOR
FRANK L. MAIN
BY
ATTORNEYS Oct. 1, 1940.   F. L. MAIN   2,216,124
HYDRAULIC BRAKE APPARATUS
Filed April 11, 1938   2 Sheets-Sheet 2

INVENTOR
FRANK L. MAIN
BY
ATTORNEYS

Patented Oct. 1, 1940

2,216,124

UNITED STATES PATENT OFFICE 2,216,124

HYDRAULIC BRAKE APPARATUS

Frank L. Main, Birmingham, Mich., assignor to Kelsey-Hayes Wheel Company, Detroit, Mich., a corporation of Delaware Application April 11, 1938, Serial No. 201,404

15 Claims. (Cl. 188—152)

The invention relates to hydraulic brake apparatus and refers more particularly to master cylinders for use with motor vehicles and operable to produce pressure upon braking fluid to apply the brakes.

The invention has for one of its objects to provide an improved construction of master cylinder having different fluid pressure producing parts adapted to be connected to different brakes to apply the same. The invention has for another object to so construct the master cylinder that the separate braking systems may be replenished with braking fluid and also may be freed of air or other gas. The invention has for a further object to so construct the master cylinder that it may be made compact.

Figure 3:
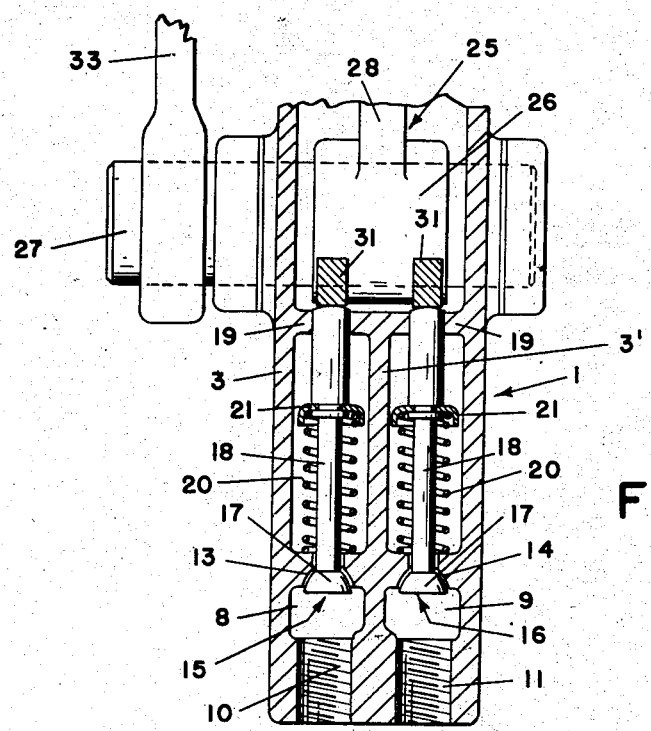
Figure 4:
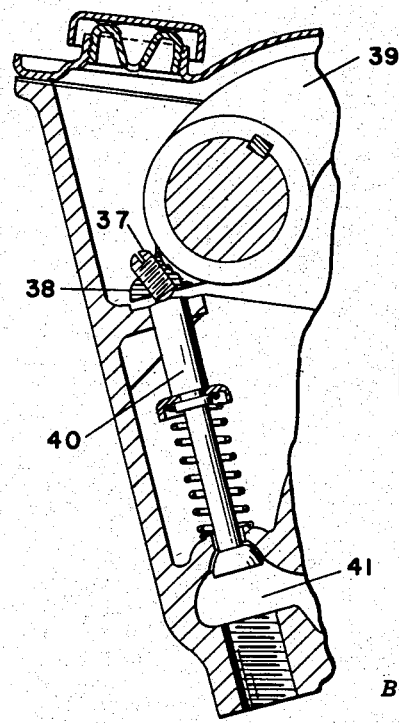

These and other objects of the invention will become apparent from the following description, taken in connection with the accompanying drawings, in which Figure 1 is a vertical section through a master cylinder showing diagrammatically the connections to the brake mechanisms and illustrating an embodiment of my invention;

Figures 2 and 3 are cross sections on the lines 2—2 and 3—3 respectively of Figure 1;

Figure 4 is a view similar to a portion of Figure 1 showing another embodiment of my invention.

The master cylinder embodying my invention is adapted particularly for use with motor vehicles and comprises the reservoir element 1 and the cylinder element 2 which is preferably formed integral with the hollow body 3 of the reservoir element. The reservoir body in the present instance has an open upper end which is closed by the cover 4 secured thereto and this cover is provided with the breather 5 providing for the passage of air to and from the reservoir. The cylinder element comprises the cylinder 6, the piston 7 and the chambers 8 and 9 having the braking fluid ports 10 and 11 respectively. The piston 7 extends concentrically within the bore of the cylinder 6 and is of smaller diameter. The piston, as shown, is in the nature of a tube threadedly secured in the wall 12 of the cylinder 6 and the axial port or passage of this piston communicates at its lower or pressure end with the chamber 9. The wall 12 is formed with a port to place the bore of the cylinder 6 at its pressure end in communication with the chamber 8.

Each of the chambers 8 and 9 are also adapted to communicate with the reservoir through the ports 13 and 14 respectively, which are located in the bottom wall of the reservoir. These ports are adapted to be closed by the valves 15 and 16, which are formed in the same manner. Each valve has the head 17 which is adapted to be moved into the chamber to open position and the stem 18 extending upwardly through the port and guided at its upper end in the bracket 19 preferably formed integral with a side wall of the reservoir body 3. For normally maintaining each valve closed, there is the coil spring 20 which encircles the valve stem and abuts the bottom wall and the C-washer or cap 21 fixedly secured to the valve stem. It will be noted that the ports 13 and 14, as well as the bearings for the valve stems, are located in axial alignment with the ports 10 and 11 respectively.

22 is a combined piston and cylinder which is adapted to be reciprocated within the bore of the cylinder 6 and which encircles the stationary piston 7. The space between the piston portion of the combined piston and cylinder and the wall of the bore of the cylinder is sealed by the annular packing 23 which is preferably mounted in an annular channel of the combined piston and cylinder and slidably engages the wall of the bore. The cylinder portion of the combined piston and cylinder is formed by a central recess concentric with the combined piston and cylinder and the space between the wall of this cylinder portion and the wall of the piston 7 is sealed by the annular packing member 24 which is preferably located in an annular groove formed in the piston 7 and slidably engages the cylinder portion. Both of the annular packing members are preferably formed of rubber.

25 is a bell crank having the hub 26 fixedly secured upon the shaft 27 which extends transversely through and is journaled in the side walls of the reservoir body 3. This bell crank is located within the reservoir and has the arm 28 for reciprocating the combined piston and cylinder 22 through the connecting rod 29. The opposite end portions of this connecting rod are preferably ball shaped and are adapted when the combined piston and cylinder is being advanced to engage cooperating bearings upon the combined piston and cylinder and the arm. The ball portions are loosely connected to the combined piston and cylinder and the arm by pins 30. The bell crank is also provided with a pair of arms 31 which are on the side of the shaft 27 opposite the arm 28 and which are spaced longitudinally of the hub to engage the upper ends of the valve stems 18 to open the valves during the final portion of the retractile movement of the combined piston and cylinder. These arms are engageable with the stops 32 formed upon the brackets 19 to limit the retractile movement.

The bell crank may be operated in any usual manner as by means of the lever 33 secured to an end of the shaft 27 beyond a side wall of the reservoir body 3, the free end of this lever being connected by the link 34 to the foot pedal 35 of the motor vehicle. The foot pedal is normally held in its off or inoperative position by the coil spring 36.

The port 10 is adapted to be connected by suitable tubing 43 to the actuators or wheel cylinders 44 for the front wheel brakes of the motor vehicle, while the port 11 is adapted to be connected through suitable tubing 45 to the actuators or wheel cylinders 46 for the rear wheel brakes of the motor vehicle. The effective pressure applying areas of the master cylinder may be varied, as desired, and in the present instance are preferably such that upon advance of the combined piston and cylinder the front wheel brakes are subjected to a greater pressure than the rear wheel brakes.

For example, my master cylinder for use with a well known make of motor vehicle is designed so that the pressure applying areas are proportioned to apply 60 per cent of the total braking pressure to the front wheel brakes and 40 per cent of the total braking pressure to the rear wheel brakes. This ratio is such that the front wheel brakes will not cause skidding of the front wheels under any load distribution and provision is made for all tolerances in the manufacture of the master cylinder. Furthermore, the cost of the brake apparatus can be reduced because the actuators or wheel cylinders for both front and rear wheel brakes can be of the same size.

For the purpose of assuring operation of at least one pair of brakes in the event that a leak develops in either the front wheel braking system or the rear wheel braking system, I have provided the partition wall 3' within the reservoir body 3 and preferably integral therewith. This partition extends vertically between the ports 13 and 14 and has its upper edge extending substantially horizontally from the bracket 19 to the adjacent portion of the cylinder 6. As a result, the partition creates two compartments within the lower portion of the reservoir, each of which is adapted to communicate with one of the chambers of the cylinder element.

The master cylinder partially illustrated in Figure 4 is constructed in the same manner as that illustrated in Figures 1, 2 and 3 with the exception that I have provided the adjustment screw 37 threadedly engaging the arm 38 of the bell crank 39 and engageable with the valve 40 which controls the port affording communication between the reservoir and the chamber 41 in communication with the actuators or wheel cylinders for the front wheel brakes. The other arm for actuating the valve controlling the communication between the reservoir and the chamber connected to the actuators or wheel cylinders for the rear wheel brakes is not provided with a set screw but is directly engageable with the stem of the valve. With this construction the time of closing of the valve 40 may be advanced or retarded to compensate for tolerances in manufacture of the cylinder and secure closing and opening of both this valve and the companion valve at exactly the same time. By reason of this construction, the optimum of performance may be secured.

What I claim as my invention is:

1. A master cylinder for operating a plurality of brake mechanisms, comprising a cylinder element having a bore and a pair of separate chambers formed with braking fluid ports each communicating with one of said brake mechanisms, a piston extending within and fixed in relation to said bore and having a port therethrough, one of said chambers communicating with said bore and the other of said chambers communicating with said piston port, and a reciprocable combined piston and cylinder located within said bore and encircling said first mentioned piston and adapted to force braking fluid through said chambers and their ports.

2. A master cylinder for operating a plurality of brake mechanisms, comprising a cylinder having a braking fluid passage communicating with one of said brake mechanisms, a piston extending within and fixed with relation to said cylinder and having a braking fluid passage communicating with another of said brake mechanisms, and a reciprocable combined piston and cylinder located between said first mentioned cylinder and first mentioned piston and adapted to force braking fluid separately through said passages.

3. A master cylinder for operating a plurality of brake mechanisms, comprising a cylinder element having a bore, a piston extending within and fixed with relation to said bore and having a port therethrough, a pair of adjacent separate chambers at the pressure ends of said bore and piston port each formed with a braking fluid port communicating with one of said brake mechanisms, one of said chambers communicating with said bore and the other of said chambers communicating with said piston port, and a reciprocable combined piston and cylinder located within said bore and encircling said first mentioned piston and adapted to force braking fluid through said chambers and their ports.

4. A master cylinder comprising a cylinder having a braking fluid passage, a piston extending within and fixed relation to said cylinder and having a braking fluid passage, a reservoir adapted to communicate with each of said passages, valves controlling the communications, a reciprocable combined piston and cylinder located between said first mentioned cylinder and first mentioned piston and adapted to force braking fluid through said passages, and an operating member common to both of said valves and said combined piston and cylinder for operating the same.

5. A master cylinder comprising a cylinder element having a bore, a piston extending within and fixed with relation to said bore and having a port therethrough, a pair of separate chambers formed with braking fluid ports, one of said chambers communicating with said bore and the other of said chambers communicating with said piston port, a reservoir adapted to communicate with each of said chambers, valves for controlling the communications, a reciprocable combined piston and cylinder located within said bore and encircling said first mentioned piston and adapted to force braking fluid through said chambers and their ports, and a bell crank operatively connected to both of said valves and said combined piston and cylinder for advancing the latter upon angular movement in one direction and for opening said valves upon angular movement in the opposite direction.

6. A master cylinder comprising a cylinder having a braking fluid passage, a piston extending within and fixed with relation to said cylinder and having a braking fluid passage, a reservoir adapted to communicate with each of said passages, valves controlling the communications, a reciprocable combined piston and cylinder located between said first mentioned cylinder and first mentioned piston and adapted to force braking fluid through said passages, and means for operating said combined piston and cylinder and both of said valves, comprising an angularly movable member, and adjustable means upon said member engageable with one of said valves.

7. A master cylinder, comprising a cylinder, a piston therein, a second cylinder, a piston therein, a reservoir adapted to communicate with each of said cylinders, valves controlling the communications, and an operating member operable upon movement in one direction to relatively reciprocate said cylinders and pistons and upon movement in the opposite direction to open said valves.

8. In a braking system for vehicles, brake actuating devices for the front wheels of the vehicle, brake actuating devices for the rear wheels of the vehicle, a master cylinder comprising a pair of cylinders, pistons therein, a fluid conduit establishing communication between one of said cylinders and the brake actuating devices for the front wheels of the vehicle, a second fluid conduit establishing communication between the other of said cylinders and the brake actuating devices for the rear wheels of the vehicle, a reservoir adapted to communicate with each of said cylinders, valves controlling the last mentioned communications, and an operating member operable upon movement in one direction to relatively reciprocate said cylinders and pistons and upon movement in the opposite direction to open said valves.

9. In a braking system for vehicles, brake actuating devices for the front wheels of the vehicle, brake actuating devices for the rear wheels of the vehicle, a master cylinder comprising a pair of cylinders, pistons therein, a fluid conduit establishing communication between one of said cylinders and the brake actuating devices for the front wheels of the vehicle, a second fluid conduit establishing communication between the other of said cylinders and the brake actuating devices for the rear wheels of the vehicle, a reservoir, a partition dividing said reservoir into two separate chambers each adapted to communicate with one of said cylinders, a pair of valves for controlling the last mentioned communications, springs normally holding said valves in closed positions, and an operating member operable upon movement in one direction to relatively reciprocate said cylinders and pistons and upon movement in the opposite direction to open said valves.

10. In a braking system for vehicles, brake actuating devices for the front wheels of the vehicle, brake actuating devices for the rear wheels of the vehicle, a master cylinder comprising a pair of cylinders, pistons therein, a reservoir, a pair of separate chambers each having a port establishing communication with said reservoir, one of said chambers communicating with one of said cylinders and the other of said chambers communicating with the other of said cylinders, a pair of valves for controlling said ports having heads extending into said chambers and stems extending into said reservoir, springs for normally holding said valves in closed position, a fluid conduit establishing communication between one of said chambers and the brake actuating devices for the front wheels of the vehicle, a second fluid conduit establishing communication between the other of said chambers and the brake actuating devices for the rear wheels of the vehicle, and an operating member engageable with the stems of said valves to open the latter upon movement of said operating member in one direction and operable to relatively reciprocate said cylinders and pistons upon movement in the opposite direction.

11. A master cylinder, comprising a cylinder, a piston therein, a second cylinder, a piston therein, a reservoir adapted to communicate with each of said cylinders, valves controlling the communications, an operating member operable upon movement in one direction to relatively reciprocate said cylinders and pistons and upon movement in the opposite direction to open said valves, and adjustable means upon said operating member engageable with one of said valves.

12. In a hydraulic braking system for vehicles, brake actuating mechanism for the front wheels of the vehicle, brake actuating mechanism for the rear wheels of the vehicle, a cylinder having a braking fluid passage communicating with one of said brake actuating mechanisms, a piston extending within and fixed with relation to said cylinder and having a braking fluid passage communicating with the other of said brake actuating mechanisms, and a reciprocable combined piston and cylinder located between said first mentioned cylinder and first mentioned piston and adapted to force braking fluid separately through said passages.

13. In a hydraulic braking system for vehicles, brake actuating mechanism for the front wheels of the vehicle, brake actuating mechanism for the rear wheels of the vehicle, a cylinder having a bore, a piston extending within and fixed with relation to said bore and having a port therethrough, a pair of separate chambers at the pressure ends of said bore and piston port, one of said chambers communicating with said bore and the other of said chambers communicating with said piston port, a fluid conduit establishing communication between one of said chambers and the brake actuating mechanism for the front wheels of the vehicle, a second fluid conduit establishing communication between the other of said chambers and the brake actuating mechanism for the rear wheels of the vehicle, and a reciprocable combined piston and cylinder located within said bore and encircling said piston and adapted to force braking fluid through said chambers and their conduits.

14. A master cylinder, comprising a cylinder, a piston in said cylinder and having a bore forming a second cylinder, a second piston extending into the bore, a reservoir adapted to communicate with each of said cylinders, a pair of valves respectively controlling communication between the cylinders and reservoir, and an actuating member operable upon movement in one direction to relatively reciprocate said cylinders and pistons and upon movement in the opposite direction to open said valves.

15. A master cylinder, comprising a cylinder, a piston in said cylinder and having a bore forming a second cylinder, a second piston extending into the bore, a reservoir, a partition dividing said reservoir into two separate chambers, each chamber communicating with one of said cylinders, a pair of valves respectively controlling communication between the cylinders and said chambers, and an actuating member operable upon movement in one direction to relatively reciprocate said cylinders and pistons and upon movement in the opposite direction to open said valves.

FRANK L. MAIN.